US006944159B1

(12) United States Patent
Fotedar et al.

(10) Patent No.: US 6,944,159 B1
(45) Date of Patent: Sep. 13, 2005

(54) METHOD AND APPARATUS FOR PROVIDING VIRTUAL POINT TO POINT CONNECTIONS IN A NETWORK

(75) Inventors: Shivi Fotedar, San Jose, CA (US); Rajeev V. Manur, Sunnyvale, CA (US); Somsubhra Sikdar, San Jose, CA (US)

(73) Assignee: Force10 Networks, Inc., Milpitas, CA (US)

( * ) Notice: Subject to any disclaimer, the term of this patent is extended or adjusted under 35 U.S.C. 154(b) by 800 days.

(21) Appl. No.: 09/834,485

(22) Filed: Apr. 12, 2001

(51) Int. Cl.[7] .............................. H04J 3/16; H04L 12/28
(52) U.S. Cl. ....................... 370/392; 370/400; 370/469
(58) Field of Search ................................. 370/230, 401, 370/352, 256, 469, 471, 389, 392, 400, 475; 709/230, 252, 236, 242

(56) References Cited

U.S. PATENT DOCUMENTS

| 6,473,421 | B1 * | 10/2002 | Tappan ........................ 370/351 |
| 6,741,585 | B1 * | 5/2004 | Munoz et al. ............... 370/352 |
| 6,771,662 | B1 * | 8/2004 | Miki et al. ................... 370/469 |
| 6,788,681 | B1 * | 9/2004 | Hurren et al. ............... 370/389 |

OTHER PUBLICATIONS

Y. Rekhter, "http://www.arin.net/library/rfc/rfc1772.txt," T.J. Watson Research Center, IBM Corporation, pp. 1-18 (Mar. 1995).
"OSPF Design Guide," http://www.cisco.com/warp/public/104/2.html, pp. 1-19 (2000).
"Cisco IOS VLAN Services," http://www.cisco.com/warp/public/614/11.html, pp. 1-4 (2000).
"VLANs and Routers," http://www.cisco.com/warp/public/714/10.html, pp. 1-5 (2000).
"What Are OSPF Areas and Virtual Links?" http://www.cisco.com/warp/public/104/8.html, pp. 1-4 (2000).
"Metropolitan Area Networks (MANs)," http://www.erg.abdn.ac.uk/users/gorry/eg3561/intro-pages/man.html, 1 page (2000).
"Use of the IEEE assigned Organizationally Unique Identifier with ANSI/IEEE Std 802-1990 Local and Metropolitan Area Networks," *Local and Metropolitan Area Networks Tutorial*, http://www.standards.ieee.org/regauth/oui/tutorials/lanman.html, pp. 1-3 (2000).
"Open Shortest Path First (OSPF)," *Internetworking Technology Overview*, chapter 42, pp. 1-6 (Jun. 1999).
White Paper, "A short Overview of QoS Mechanisms and Their Interoperation," *Microsoft Corporation*, pp. 1-7 (1999).

* cited by examiner

*Primary Examiner*—Duc Ho
(74) *Attorney, Agent, or Firm*—Haynes and Boone, LLP

(57) ABSTRACT

Transparent point-to-point connectivity is provided between an incoming interface on an ingress node and an outgoing interface on an egress node in a network. An address associated with the egress node is circulated to the nodes in the network and a next hop address toward the egress node address is determined at each node. A label value is circulated along with the egress node address to the nodes. Examples of label values can include VLAN Ids or Multiprotocol Label Switching (MPLS) labels. If data is received having the label value, the node receiving the data identifies the next hop address associated with that label value and transfers the data to the next hop associated with the identified next hop address.

25 Claims, 6 Drawing Sheets ional Virtual Circuits (PVCs). While point-to-point connection services at an Ethernet layer provide superior speed, they do not scale well for larger networks containing a large number of processing nodes. For example, Spanning Tree Protocol (STP) protocol used in point-to-point connection services is slow in converging to changing network topologies.

METHOD AND APPARATUS FOR PROVIDING VIRTUAL POINT TO POINT CONNECTIONS IN A NETWORK

BACKGROUND

Transparent point-to-point connections between two customer sites are one of the most popular services offered by Public Carrier Networks. Over the years, this service has been provided in a variety of forms, such as T1, T3, Frame Relay, Asynchronous Transport Mode (ATM), and Permanent Virtual Circuits (PVCs). While point-to-point connection services at an Ethernet layer provide superior speed, they do not scale well for larger networks containing a large number of processing nodes. For example, Spanning Tree Protocol (STP) protocol used in point-to-point connection services is slow in converging to changing network topologies.

Layer 3 protocols, such as the Internet Protocol (IP), are designed to scale well for larger networks, and converge much faster. However, nodes in an IP network must support complex layer 3 routing tables and routing protocols such as the Border Gateway Protocol (BGP) which add complexity to the network routers, switches, and other network processing nodes.

The present invention addresses this and other problems associated with the prior art.

SUMMARY OF THE INVENTION

Transparent point-to-point connectivity is provided between an incoming interface on an ingress node and an outgoing interface on an egress node in a network. An address associated with the egress node is circulated to the nodes in the network and a next hop address toward the egress node address is determined at each node. A label value is circulated along with the egress node address to the nodes. Examples of label values can include VLAN Ids or Multi-protocol Label Switching (MPLS) labels. If data is received having the label value, the node receiving the data identifies the next hop address associated with that label value and transfers the data to the next hop associated with the identified next hop address.

DETAILED DESCRIPTION

Figure 1:
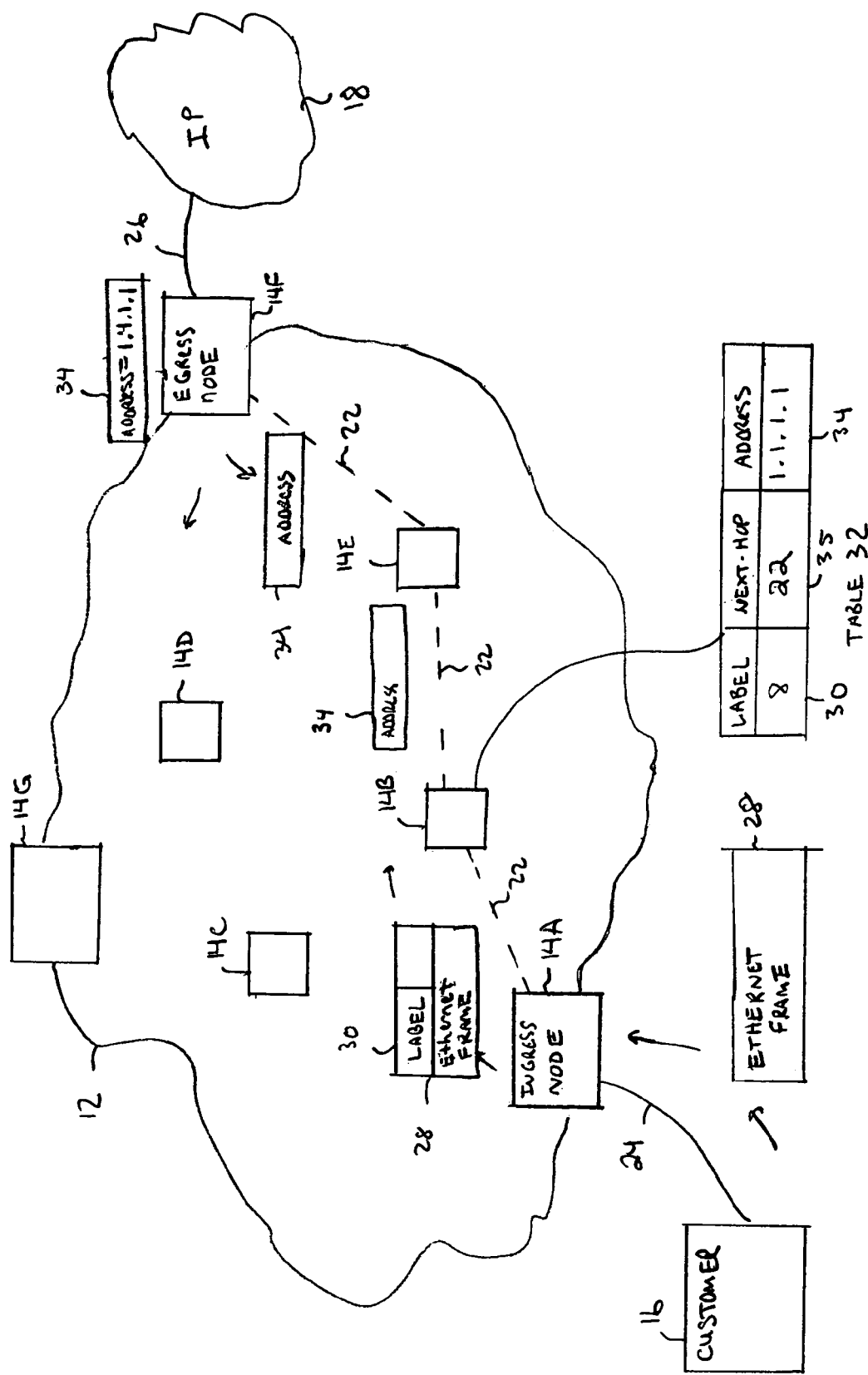
FIG. 1 is a diagram of a network that uses Ethernet frame labels to establish a virtual point to point connection.

FIG. 1 shows a network 12. In one example, the network 12 is a Metropolitan Area Network (MAN) but the network 12 can be any Local Area Network (LAN), Virtual Local Area Network (VLAN), or even a Wide Area Network (WAN) that uses the labeling scheme described below. Multiple network processing nodes (nodes) 14 are located at different places in network 12. The nodes 14 can be any router, switch, gateway, call concentrator, etc. used for transferring data in network 12.

Some of the nodes 14, such node 14A, operate as ingress nodes that allow customers, such as customer 16, to connect through the network 12 to other endpoints, such as other customers on IP network 18. In one example, the nodes 14 are maintained by an Internet Service Provider (ISP). In the example shown in FIG. 1, the connection 24 between customer 16 and ingress node 14A is an Ethernet connection. Some of the nodes 14, such as node 14F, operate as egress nodes that connect the customer 16 to external networks such as IP network 12. In one example, the egress node 14F is associated with a national service provider such as UUNET.

The network 12 provides logical point-to-point connections, such as connection 22, between the ingress node 14A and the egress node 14F. Examples of protocols used for establishing the logical link point-to-point connection 22 include Asynchronous Transfer Mode (ATM) and Frame Relay Permanent Virtual Circuit (PVC). Here, labels such as VLAN Ids or an MPLS label in an Ethernet frame is used to set up the point-to-point connection 22 between the ingress node 14A and the egress node 14F.

Ethernet frames 28 entering the ingress node 14A at connection interface 24 are marked with a label 30. In this example, the label 30 is a VLAN Id value. However, any labeling scheme can be used. The intermediate nodes 14B–14E in the path to the egress node 14F keep forwarding entries 35 in a table 32. The forwarding entries 35 in table 32 identify the egress interface (next hops) for forwarding the Ethernet frame 28 towards the egress node 14F.

The forwarding entries 35 are determined according to an IP address 34 for the egress node 14F in the point-to-point connection 22. The value of label 30 is used in table 32 as an index to forwarding entry 35. The nodes 14 check all the received Ethernet frames 28 for a label 30. If the Ethernet frames 28 contain a label value matching one of the label values in table 32, the node 14 forwards the Ethernet frame to the next hop 35 indexed by the matching label. Thus, the nodes 14 transparently switch the Ethernet frame 28 from the ingress node 14A to the egress node 14F. This transparent switching is performed on a layer 2 protocol level preventing the nodes 14 from having to use and support complex layer 3 routing protocols, such as the BGP protocol, to route data over the network 12.

However, the network 12 exploits some limited layer 3 protocol features to extend the normal switching area of network 12 to a larger metropolitan area. For example, a layer 3 flooding protocol is used to notify the nodes 14 in network 12 of the IP address for the egress node 14F and to determine next hops for the point-to-point connection 22. This allows quick convergence for new network topologies.

Figure 2:
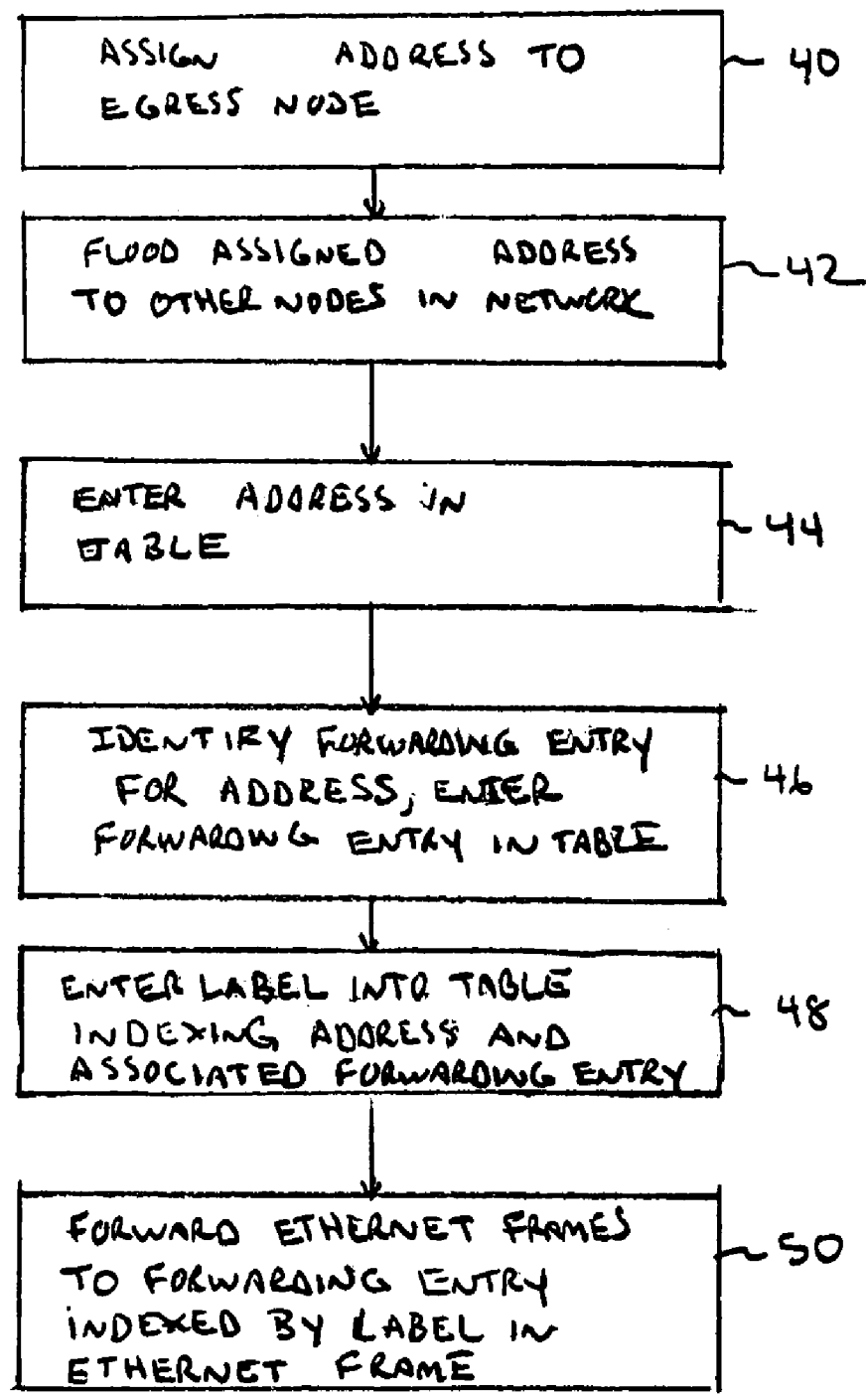
FIG. 2 is a block diagram showing how the transparent point-to-point connection is established in the network shown in FIG. 1.

Referring to FIGS. 1 and 2, the egress node 14F is assigned a unique address 34 in block 40. In the example shown in FIG. 1, the address 34 for the egress node 14F is an IP address selected as "1.1.1.1". But any unique address value can be used that conforms with the flooding protocol used for advertising the address 34 to the nodes in network 12. In block 42, the egress node 14F uses a flooding protocol, such as Open Shortest Path First (OSPF), to advertise the egress node IP address 34 to all of the other nodes 14 in network 12.

In block 44, the nodes 14 each enter the egress node address 34 into their respective tables 32 and in block 46 the nodes 14 identify a forwarding entry 35 for the address 34. The forwarding entry 35 is the egress interface to the next node 14 in network 12 where the Ethernet frame 28 is transferred in the point-to-point connection 22 between ingress node 14A and egress node 14F. For example, node 14B receives egress node address 34 during flooding. The OSPF protocol is then used by node 14B to determine the shortest path to the egress node address 34 in point-to-point connection 22. Accordingly, node 14B uses the egress interface to node 14E as the next hop 35.

Block 48 may leverage the same flooding protocol, or use some other scheme, to notify all the nodes 14 that a particular label value 30 is associated with a particular egress address value 34. In the example shown in FIG. 1, the label value "8" is associated with egress address "1.1.1.1". This is just an example. Any unique label value can be associated with any unique egress node address value. Node 14B enters the value "8" into table 32 as the index for egress node IP address "1.1.1.1" and associated egress interface for path 22.

The same step is performed by each node 14 along connection 22. For example, node 14E identifies the interface to egress node 14F as the next hop for label 8. Block 50 then forwards Ethernet frames 28 according to the value of the label 30. For example, the Ethernet frame 28 is received by node 14B having a label value of "8". Because label value 30 in Ethernet frame 28 matches an entry in table 32, node 14B forwards the Ethernet frame 28 to the next hop 14E indexed by label value "8".

Figure 3:
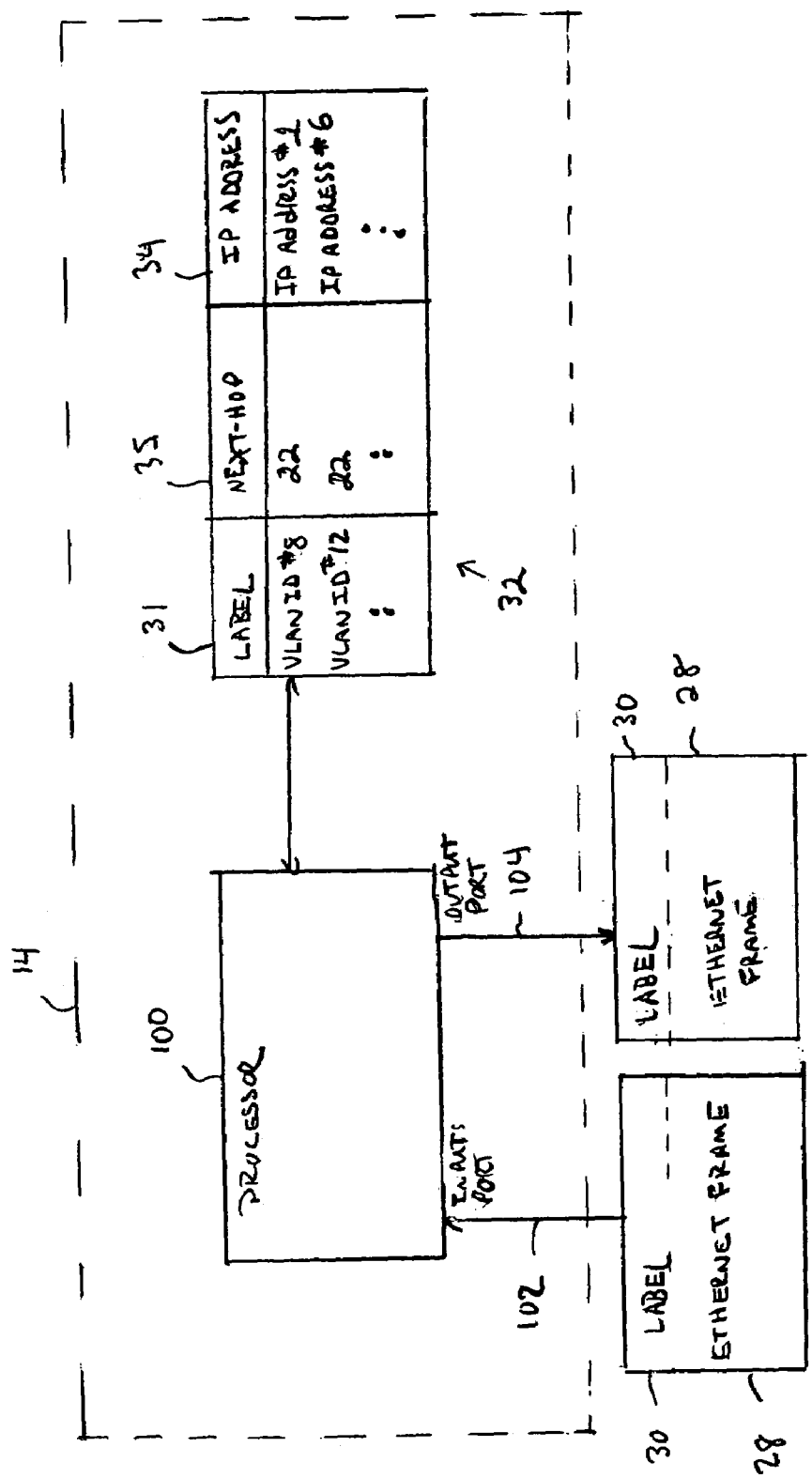
FIG. 3 is a detailed block diagram for one of the nodes in the network shown in FIG. 1.

FIG. 3 is a more detailed diagram for any one of the nodes 14 in network 12. An input port 102 receives the Ethernet frame 28 containing the label 30. A processor 100 references table 32 to identify any table entry 31 matching the value of label 30. The table entries 31 in one example are VLAN Id values. If a match exists, processor 100 identifies the egress interface 35 along connection 22 for the matching entry 31. The processor 100 then forwards the Ethernet frame 28 to the output port 104 for the identified next hop along point-to-point connection 22.

The table 32 identifies next hops 35 for multiple egress node IP addresses 34. Thus, point-to-point connections can be established between any ingress node incoming interface and egress node outgoing interface in network 12. The processor 100 initially receives the egress node IP address 34 by some means, such as a Link-State Advertisement (LSA) packet 60 as described below in FIG. 4. The processor 100 may receive in the same LSA packet, or in some different packet or advertisement, the label value 31 associated with the egress node IP address 34. The entries in table 32 may alternatively be configured manually by a system administrator. The processor 100 updates table 32 either manually or through a flooding process whenever a new egress node IP address or VLAN Id label is received.

DISTRIBUTION OF FORWARDING ENTRY INFORMATION

There are several ways to distribute the egress node IP address 34 and associated label 30 throughout network 12. In one embodiment, a network administrator manually configures the network by using a script that sends out egress node IP addresses 34 and associated labels 30 to the nodes 14.

Figure 4:
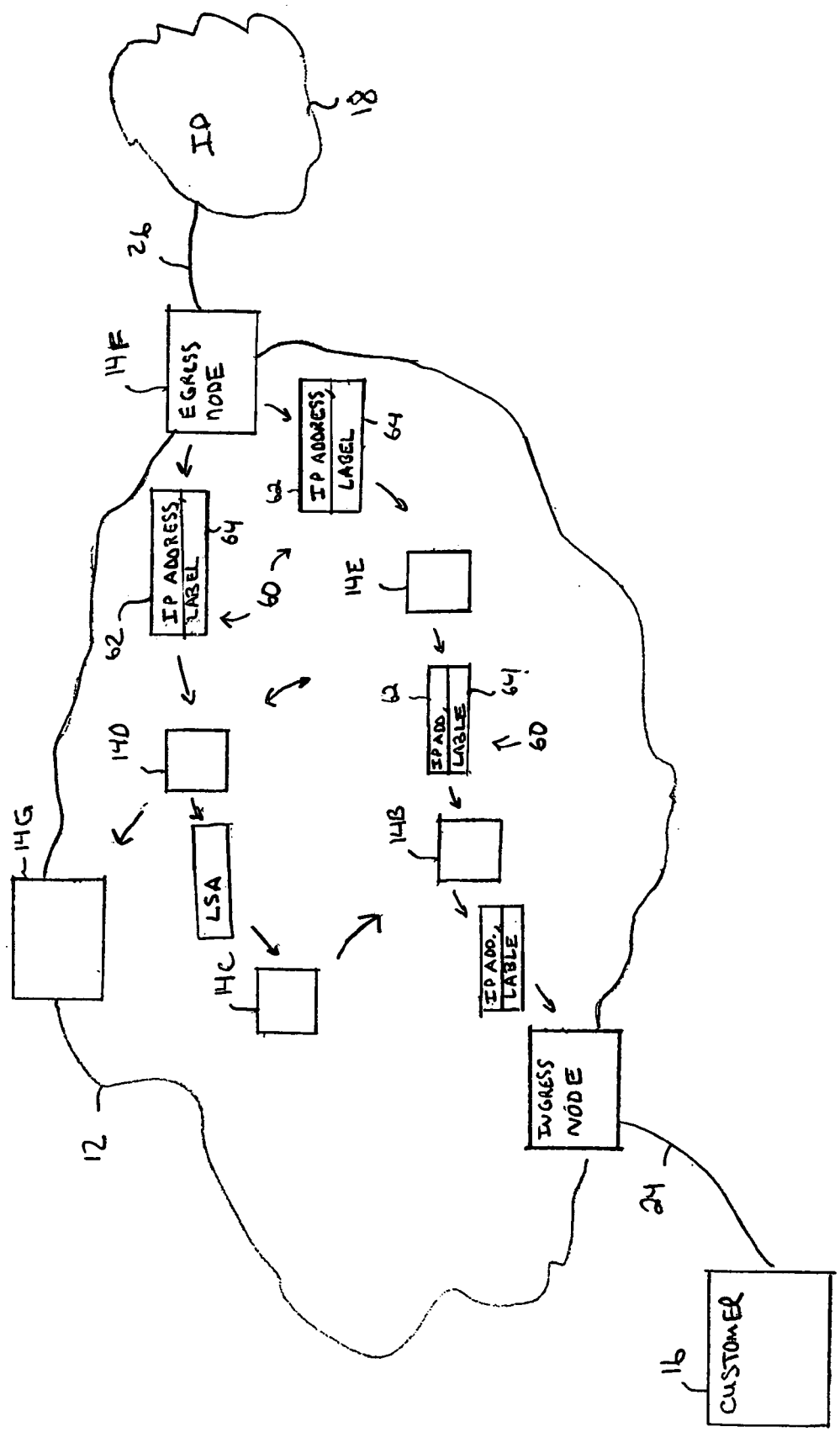
FIG. 4 is a diagram showing how address/label associations are flooded to nodes in the network.

In another embodiment a flooding protocol is used to distribute the egress node address and associated label. FIG. 4 shows in further detail how an Open Shortest Path First (OSPF) protocol flooding is used to advertise the egress node IP address and associated VLAN Id values (labels). However, any other protocol which supports flooding such as an Intermediate System to Intermediate System (ISIS) protocol can be used. The egress node 14F sends a Link-State Advertisement (LSA) packet 60 to the rest of the nodes 14 in network 12. The LSA packet 60 is distributed in one example using an Interior Gateway Protocol (IGP), such as the OSPF routing protocol. The LSA packet 60 includes a first field 62 that identifies the IP address for the egress node 14F. A second field 64 includes the associated VLAN Id value that is used as an Ethernet frame label.

In a first stage, the egress node 14F floods the egress node IP address and the VLAN Id value to all the nodes 14 in network 12. During flooding, some nodes 14 may receive the same egress node IP address and VLAN Id value from multiple neighboring nodes. In a second stage, the OSPF protocol is used by the nodes 14 to determine a shortest path back to the IP address 62 for egress node 14F. During the SPF stage, each node 14 identifies the next hop in the shortest path back to egress node 14F. The next hop node 14 is then used as the forwarding entry in that node for the VLAN Id that was sent out with the egress node IP address during the flooding stage.

Thus, each node 14 in network 12 uses the SPF algorithm to determine a next hop to the egress node IP address in field 62 of the LSA packet 60. The same next hop is then used as the forwarding entry 35 in table 32 (FIG. 1) for the VLAN Id value advertised with the egress node IP address in the LSA 60. In other words, the egress interface computed by the SPF algorithm for getting to the egress node is used as the next hop identifier 35 for the layer 2 forwarding entry of the VLAN Id value 31 (FIG. 3).

Figure 5:
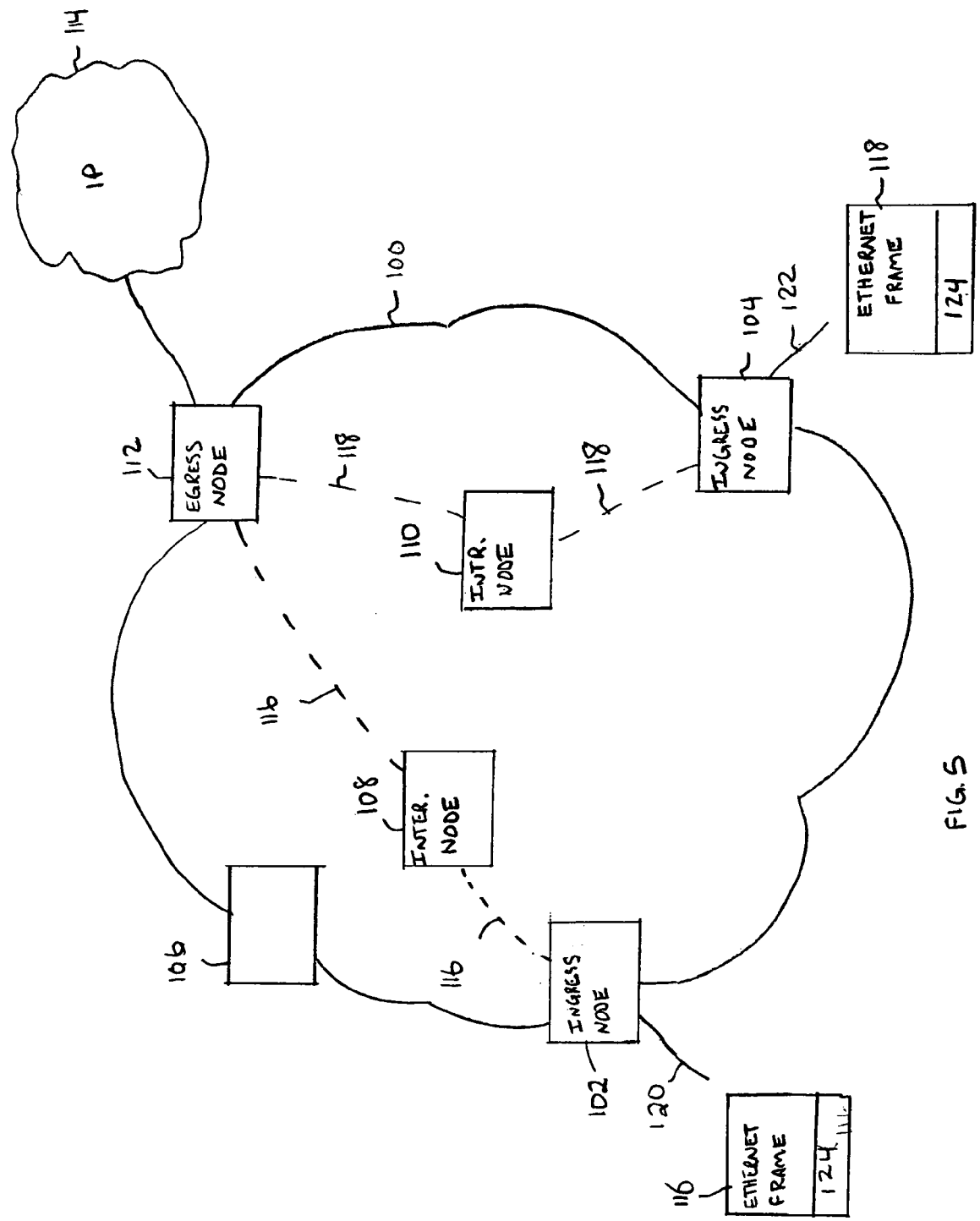
FIG. 5 is a diagram showing how multiple transparent point-to-point connections are established for Ethernet frames received at different ingress nodes.

FIG. 5 shows how multiple virtual point to point connections can be established for packets received on different ingress nodes. A network 100 includes multiple ingress nodes 102 and 104, multiple intermediate nodes 108 and 110, and an egress node 112. The egress node 112 is connected to an IP network 114.

Ethernet frames 116 and 118 can enter the network 100 from any ingress-interface on any ingress-edge-node in the network. In this example, the Ethernet frame 116 enters the network 100 from a connection 120 on ingress node 102 and Ethernet frame 118 enters network 100 from a connection 122 on ingress node 104. A point to point circuit 116 is established between ingress node 102 and egress node 112 and a point to point circuit 118 is established between ingress node 104 and egress node 112. The point to point circuits 116 and 118 use the same label to carry traffic.

The scheme for flooding the label and the associated IP address for the egress node 112 to the nodes in network 100, deriving next hops to the egress node, and adding the next hops as forwarding entries in a forwarding table can be the same as described above in FIGS. 1–4. Any Ethernet frames 116 entering the ingress node 102 at connection interface 120 are marked with a label 124. Any Ethernet frames 118 entering the ingress node 104 at connection interface 122 are also marked with the label 124. In this example, the label 124 is a VLAN Id value. However, any labeling scheme can be used.

As long as the label 124 in the Ethernet frames 116 and 118 match a label in the forwarding tables, the intermediate nodes 108 and 110 can forward the labeled frames. The frames 116 and 118 are forwarded to the next hop entry in the forwarding table regardless of which incoming-interface on the intermediate node the packet was received on. Thus, the nodes 102 and 108 will forward frames having a label 124 along connection 116 to egress node 112. The nodes 104 and 110 will forward frames having a label 124 along connection 118 to egress node 112.

Figure 6:
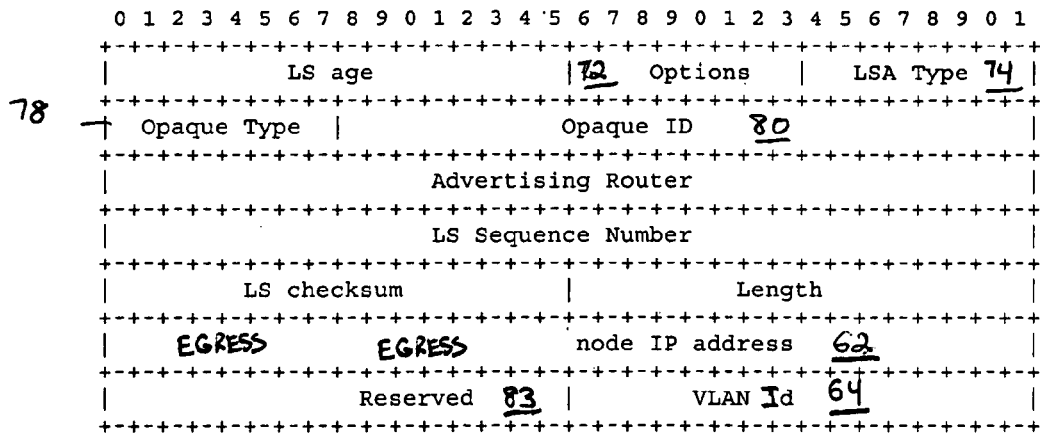
FIG. 6 is a diagram of a Link-State Advertisement (LSA) packet used in Open Shortest Path First (OSPF) protocol for notifying the nodes in the network of an egress node IP address and an associated VLAN Id label value.

FIG. 6 shows in more detail the OSPF Opaque Link-State Advertisement (LSA) packet 60 previously described. The LSA packet 60 is flooded over the network 12 (FIG. 4) from the egress node 14F. The LSA packets 60 allow distribution of non-standard, or proprietary, information in the OSPF domain. There are three types of Opaque LSAs, including type 9, type 10 and type 11. The main difference among the three LSAs is the scope of flooding. A type 9 LSA only floods a specific subnet. A type 10 LSA is restricted to a particular area and a type 11 LSA floods an entire OSPF domain, except stub areas. The type 11 LSA is preferable but Type 10 can also be used if the network 12 is considered one single area.

The LSA packet 60 includes multiple fields. A zero bit is set to a value of 1 in an options field 72. An LSA type field 74 is set to a value of 11 and an Opaque Type field 78 is set to a value of 128. Values in the range of 128–255 are reserved for private use.

An Opaque Id field 80 is set to zero. Right after the LSA packet header, a field 62 contains the IP address for the egress node 14F. The field 64 contains the VLAN ID value. A reserved field 83 is set to zero since Opaque LSAs must be padded to 32-bit alignment. If the VLAN Id value is less then the number of bits available in field 64, the most significant bits of the VLAN Id field 64 are set to zero.

Figure 7:
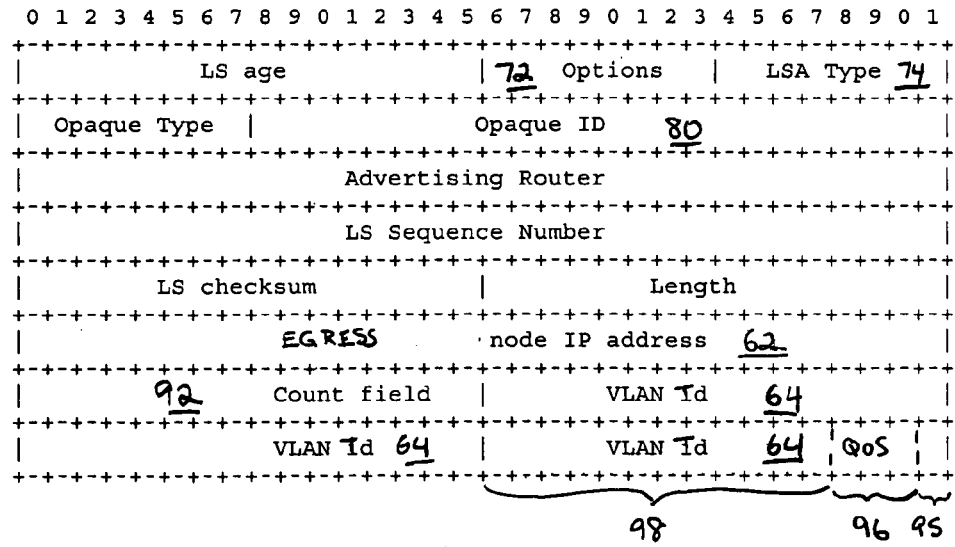
FIG. 7 is a Link-State Advertisement that notifies the nodes of multiple VLAN Ids associated with the same egress node IP address.

Referring to FIG. 7, it is possible that more than one logical point-to-point connection will terminate on the same node, with each connection having a different VLAN Id value. Instead of using one Opaque LSA packet 60 (FIG. 6) to advertise only one pair of IP address—VLAN Id associations, LSA packet 90 lists all the VLAN Ids originating from the same egress node 14F. This is achieved by replacing the reserved field 83 in FIG. 6 with a count field 92. The count field 92 identifies the number of VLAN Ids listed in the LSA 90. The count field 92 is then followed by a list of VLAN Id fields 64. Each VLAN Id field 64 sets any unnecessary beginning bits to zero.

The above LSA distribution can also be used to advertise Quality of Service (QoS) parameters, such as defined by the Institute of Electrical and Electronic Engineers Standard 802.1p. The QoS parameter sets quality of service for the logical point-to-point path between the ingress node 14A and the egress node 14F. Just as the IP address in field 62 is associated with the VLAN Id in field 64, the QoS parameter can also be associated with the VLAN Id. In the VLAN Id field 64 of the LSA 60 (FIG. 6) or LSA 90, the first bit 95 is set to zero, the next three bits 96 are set to some 802.1p value, and the last twelve bits 98 are set to the VLAN Id value. Each intermediate node that receives the LSA 60 or 90, now inserts the QoS parameter in the forwarding entry for the VLAN Id 64, along with the egress port.

The links in network 12 established using the above scheme are preferably point-to-point links. Otherwise two upstream nodes on the same subnet will pick up the Ethernet frame from the downstream node and forward a copy of the frame towards the egress node, thereby causing replication of Ethernet frames. Alternatively, a protocol could be used between nodes on a subnet that allows only two of these nodes to install the forwarding entry.

The size of the VLAN Id field 64 may limit the number of point-to-point links. For example, a VLAN Id field of 12 bits, provides 4000 possible point-to-point links. If one value is used for each unidirectional link, then the 12 bits support only 2000 bi-directional point-to-point links. To increase the number of point-to-point links, Multiprotocol Label Switching (MPLS) is used. MPLS labels are 20 bits and alternatively are used to provide up to 500,000 possible bi-directional point-to-point links.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features can be implemented by themselves, or in combination with other operations in either hardware or software. While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventors regard the subject matter of the invention to include all combinations and sub combinations of the various elements, features, functions and/or properties disclosed herein.

What is claimed is:

1. A method for establishing a logical point to point connection in a network comprising a plurality of connected switching nodes, the method comprising:
   identifying an address for an egress node in the network and a label value associated with that address;
   at each switching node other than the egress node, identifying a next hop node in the network for the label value; and
   at intermediate switching nodes along a logical point to point connection within the network, receiving data that includes the label value and then transferring the data to the next hop node for the label value.

2. A method according to claim 1 including:
   receiving the egress node address and associated label value during a layer 3 flooding stage;
   identifying the next hop node by using a layer 3 protocol that identifies the shortest path to the egress node; and
   transferring the data to the identified next hop node using a layer 2 switching based on the label value.

3. A method according to claim 1 including transferring the data independently of any payload type for the data.

4. A method according to claim 3 wherein the payload type for the data comprises IP packets having IP destination addresses, the method comprising forwarding the data to the next hop node without using the IP destination addresses.

5. A method according to claim 1 including receiving the address and the label value together via a flooding protocol.

6. A method according to claim 5 wherein the flooding protocol is an Interior Gateway Routing Protocol based on an Shortest Path First scheme.

7. A method according to claim 5 wherein the flooding protocol is an IP flooding protocol.

8. A method according to claim 5 including using a Shortest Path First (SPF) protocol after the flooding protocol to identify the next hop node for the label value.

9. A method according to claim 1 including maintaining a table that associates different label values with different egress node addresses.

10. A method according to claim 1 including receiving the egress node address and the label value via an Opaque Link-State Advertisement (LSA) packet.

11. A method according to claim 10 including providing multiple label values in the LSA packet for the same egress node address.

12. A method according to claim 1 including receiving a Quality of Service (QoS) value along with the label value.

13. A method according to claim 1 wherein the address is an IP address, the data is an Ethernet frame and the label value is a VLAN Id value.

14. A method according to claim 1 wherein the address is an IP address, the data is an Ethernet frame and the label value is a MPLS label.

15. A method according to claim 1 including maintaining a table that associates different label values with different egress node addresses.

16. A metropolitan area network, comprising:
an egress node having a layer 3 address;
intermediate nodes that use the layer 3 address to identify next hops for transferring an Ethernet frame to the egress node; and
an ingress node that establishes a layer 2 logical point-to-point connection through the intermediate nodes to the egress node by assigning a label to the Ethernet frames that the intermediate nodes associate with the identified next hops along the point-to-point connection.

17. A metropolitan area network according to claim 16 including tables in the intermediate nodes that index the next hops using the label assigned to the Ethernet frame.

18. A metropolitan area network according to claim 16 wherein the ingress node is part of an Internet Service Provider network.

19. A metropolitan area network according to claim 16 wherein the label is a VLAN Id.

20. A metropolitan area network according to claim 16 wherein the label is a MPLS label.

21. A metropolitan area network according to claim 16 wherein the egress node uses a layer 3 flooding protocol to transmit the layer 3 address to the intermediate nodes and the intermediate nodes then use a layer 3 route identification protocol to determine the next hops.

22. A metropolitan area network according to claim 16 wherein the egress node sends an Opaque Link-State Advertisement (LSA) packet to the intermediate nodes that contain the egress node address and the label associated with the egress node address.

23. The network according to claim 16 wherein the label includes a Quality of Service value.

24. A metropolitan area network according to claim 16 including:
multiple ingress nodes that are configured to assign a same label value to the Ethernet frames received over ingress connections; and
intermediate nodes that establish different point to point connections from the multiple ingress nodes to the egress node by identifying the next hops for the Ethernet frames according to the same label value.

25. A metropolitan area network according to claim 24 wherein the intermediate nodes forward the Ethernet frames according to the label value independently of ingress input ports on the intermediate nodes receiving the Ethernet frames.

* * * * *